Nov. 5, 1940.  G. SLAYTER  2,220,127
AIR FILTER
Filed Aug. 3, 1937
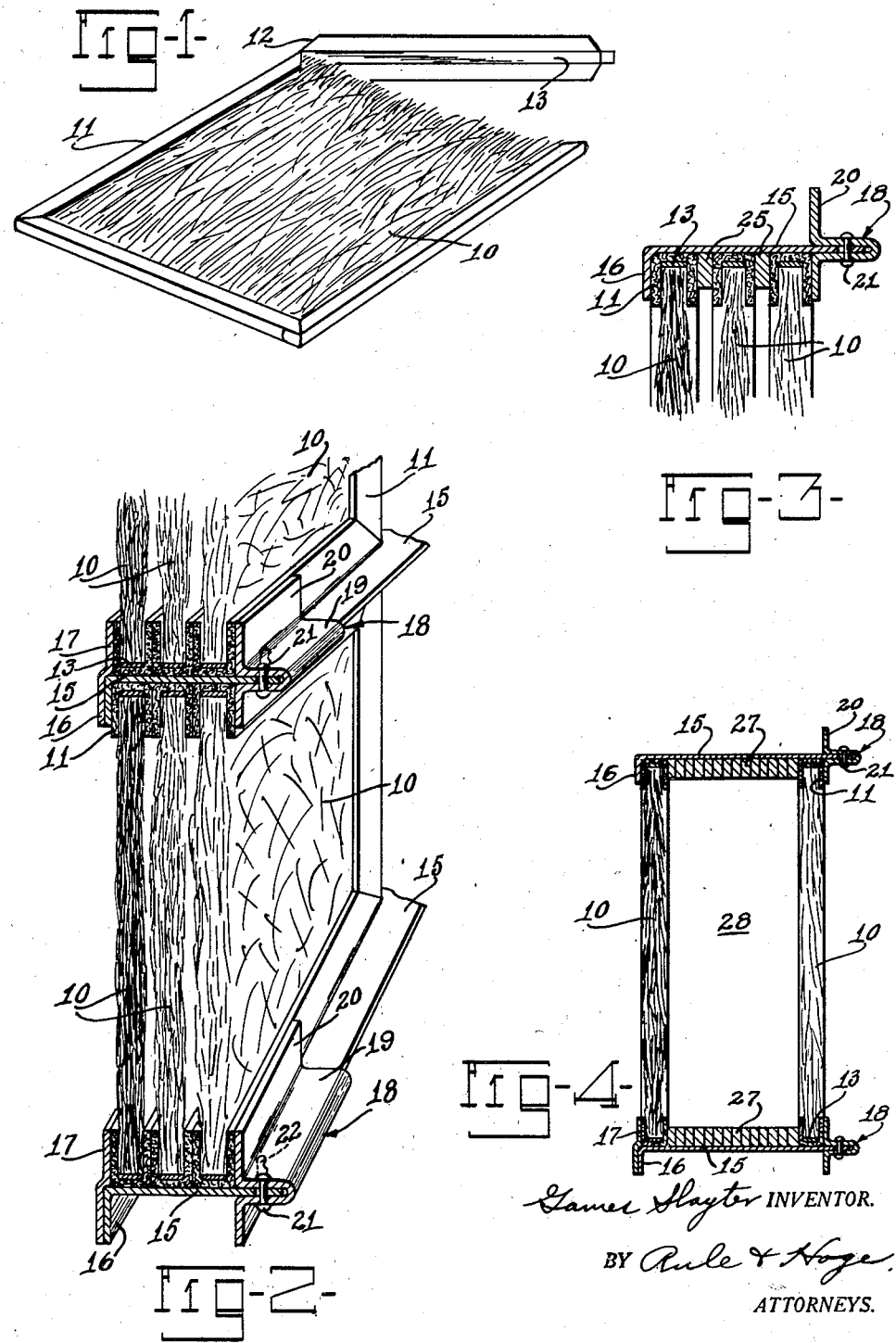
James Slayter INVENTOR.
BY Rule & Hoge
ATTORNEYS.

Patented Nov. 5, 1940

2,220,127

UNITED STATES PATENT OFFICE 2,220,127

AIR FILTER

Games Slayter, Newark, Ohio, assignor, by mesne assignments, to Owens-Corning Fiberglas Corporation, a corporation of Delaware Application August 3, 1937, Serial No. 157,170

8 Claims. (Cl. 183—49)

My invention relates to filters designed for use in filtering air or other gases and particularly to the type of filters in which individual units comprising matted fibrous material, are installed in cells provided in a supporting framework.

At the present day, filters of this type are in extensive use in which the filter units comprise a filter base consisting of glass fibers or the like in matted or bulk form, supported in a frame consisting of chip-board, cardboard, or other material of sufficient strength and rigidity to hold the filter unit in shape. With the use of such filter units, it is found necessary to provide a sealing gasket or its equivalent, between the filter unit or frame and the walls of the cell in which the filter unit is mounted, the sealing gasket serving to prevent leakage of air or gas. The use of such sealing gaskets materially adds to the cost of the filter installation, adds to the time required to install or replace the filter units in the frame cells, particularly as filter units of this type require frequent removal or replacement, and is objectionable from a sales point of view.

An object of my invention is to avoid such difficulties and objections by providing a simplified form of filter unit or pad adapted to make an effective seal with the frame in which it is installed without the need of a separate sealing gasket or other sealing means.

A further object of the invention is to provide a simplified form of pad or filter unit which can be manufactured at a comparatively low cost, this being particularly desirable in a "throwaway" type of unit designed to be discarded when it has collected dust to a normal capacity and replaced by a new filter unit.

Other objects of the invention will appear hereinafter.

Referring to the accompanying drawing:

Fig. 1 is a perspective view showing a filter unit or pad and an edge binding material partly assembled thereon;

Fig. 2 is a part sectional perspective view showing a plurality of filter units installed in a supporting frame;

Fig. 3 is a fragmentary sectional view showing a modification including means for spacing a plurality of superposed filter pads; and Fig. 4 is a sectional elevation of a further modification in which the filter pads are more widely spaced.

Referring particularly to Fig. 1, a filter unit is shown comprising a pad 10 of fibrous material forming the filter base. This may consist of glass fibers more or less felted or matted, with the fibers extending mainly in planes substantially parallel with the major surfaces of the filter unit. The fibers may extend promiscuously in all directions within said planes but preferably the fibers are predominantly in approximate parallelism with each other. Thus, the major portion of the fibers may extend substantially vertically in a vertically disposed filter unit. The fibers are coated with a heavy oil or viscous material to which dust particles and the like will adhere. The pads 10 are preferably of sufficient rigidity and mass integrity to retain their shape without extraneous support and while being handled in the process of manufacture.

The individual pads 10 may be cut from a mat or web of the fibers made by continuous process. The edges of each pad are then covered with a binding material 11 consisting of felt or the like, which is sufficiently soft, compressible and resilient to form an effective sealing medium by which air or gas leakage is prevented when the pad is installed in a cell or frame. The felt strip 11 may be cut to a length to surround the pad and cover the four edges thereof. The strip is also substantially wider than the thickness of the pad so that the marginal portions of the strip can be folded down against the faces of the filter pad. The binder strip may also have portions cut away to provide beveled edges 12 at the corners of the pad so that when the margins of the strip are folded into position, overlapping is prevented and an unbroken smooth surface is obtained. The binding material 11 furnishes a semi-rigid edge for the filter pad which can be compressed to a certain degree so that the filter unit may be fitted snugly into the supporting frame or cell.

It is sometimes found desirable to employ a stiffening material in connection with the binder 11 for the purpose of increasing the rigidity of the filter unit as a whole and for holding the binding strip in shape, as well as increasing its effectiveness as a sealing means. For this purpose strips 13 consisting of chip-board or other relatively stiff material, are interposed between the strip 11 and the edges of the pad 10. The strips 13 are preferably made of a width substantially equal to the thickness of the pad. It will be noted that with this construction the binding strip 11, as applied to the pad, is substantially rectangular in cross section.

The filter units are adapted to be mounted in a framework which may be of conventional construction, such as shown, for example, in the patent to Collins, No. 1,898,424, February 21, 1933, the framework providing rectangular cells in which the units are installed. The framework includes horizontal sheet metal frame members 15 which form the top and bottom walls of the cells. Corresponding vertical frame members provide side walls for the cells. As shown, the rear edge portions of the frame members 15 are bent down in the form of flanges 16. These together with sheet metal strips 17 extending lengthwise of said frame members, provide abutting surfaces to engage the marginal portions of the inner faces of the filter units.

The filter pads are preferably made rather thin as compared with conventional filter units of the type indicated, and a plurality of these pads or wafers are preferably installed in each filter cell, with the pads in superposed relation. Thus, as shown in Fig. 2, three filter pads are mounted in each cell. The filter units are removably mounted in the frame or cells and held in position by means of clamping or locking bars 18. Each locking bar is bent to the form shown, comprising an intermediate U-shaped body portion 19 to slidably engage the frame member 15. The marginal portions 20 of the locking strip are vertically disposed and provide flat inner surfaces to fit against the vertical faces of the juxtaposed binding strips 11. A pin 21 extending through the body 19 is adapted to enter a slot 22 formed on the frame 15, for holding the locking bar in position. The slot 22 may be inclined so that a lengthwise movement of the locking bar 18 serves to cam it inwardly and thereby apply a clamping pressure to the filter pads.

The several pads installed in a cell are preferably made of fibers of different fineness. Thus, as shown in Fig. 2, the outermost pad is made of rather coarse fibers, the innermost pad of fine fibers, and the central pad of fibers of intermediate fineness. In this manner the air resistance of the filter is greatly reduced without impairing its efficiency, and the capacity of the filter for retaining dust and the like is greatly increased so that the filter may be used for a comparatively long period without replacement or renovation of the filter pads.

It will be seen that with the above described construction, an effective air seal is provided by the marginal strips 11, preventing air leakage between the filter units and the cell walls. The need of the usual separate sealing gaskets is thus obviated.

In Fig. 3, I have illustrated a filter assemblage in which spacing strips 25 are interposed between the adjoining filter pads so that the pads are held in spaced relation in the frame cell. The strips 25, if desired, may be in the form of rectangular frames corresponding in length and width to the filter units. These spacing strips as shown are positioned between the marginal binding strips 11 and clamped therebetween by the clamping bars 18. This permits an air seal to be maintained between the several filter pads.

It will be observed that by the use of spacing strips, a relatively small number of filter pads are required in each cell, and the pads can be made comparatively thin. I have found that by thus providing an air chamber or space between each two adjacent filter units, the efficiency and capacity of the filter as a whole is substantially increased for a given amount of filtering material.

Fig. 4 illustrates a modified construction in which the filter pads 10 are widely spaced by means of spacing strips 27 providing an air space or chamber 28 of considerable capacity between the filter units.

It will be understood that when an installation comprises filter units in which the fibers are of different finenesses, a comparatively coarse filter unit is placed at the intake side so that a greater portion of the dust or particles which are being filtered out will be caught by the coarse fibers. The inner filter pad or pads of relatively fine fibers, and the pad as a whole of a fine texture, serve to effectively remove any remaining portion of dust or fine particles from the air or gas which is being filtered.

Modifications may be resorted to within the spirit and scope of my invention.

I claim:

1. A filter unit comprising a thin mat or body of matted fibers and a strip of soft, compressible material extending along and forming a binding for the edges of said mat, said strip being bent lengthwise to a substantially U-shape in cross section so that the strip embraces the marginal portions of the mat and provides a sealing gasket overlying the marginal portions of the major faces of the mat, and a thin, flat strip of stiffening material substantially equal in width to the thickness of the mat, said stiffening strip being interposed between said soft strip and the mat and overlying and forming a facing for the edges of the mat, the faces of said stiffening strip being substantially perpendicular to the major faces of the mat.

2. The combination of a frame comprising a rectangular filter cell, a plurality of filter units mounted therein, each of said units comprising a rectangular body of loosely matted glass fibers and a marginal binder extending along the edges of the mat and surrounding the latter, said binder consisting of a strip of compressible material U-shaped in cross section to embrace the marginal portions of the filter body, said filter units being substantially coextensive in the directions of their length and width and being arranged in superposed relation, spacing strips interposed between the adjacent mats and lying in contact with said U-shaped strips, said units being movable bodily in a direction perpendicular to their major faces into position within said frame, and clamping means operable to apply pressure to the units in said direction and thereby clamp them within said cell and clamp said strips in position between the filter units.

3. A filter unit comprising a body of loosely matted, stiff fibers in the form of a thin mat or wafer, said mat being of substantially uniform thickness throughout, the marginal faces thereof being perpendicular to the major faces of the mat, a strip of soft resilient material extending along said marginal faces, and a thin flat strip of stiffening material substantially equal in width to the thickness of the mat, said stiffening strip being interposed between said soft strip and the mat and overlying and forming a facing for a marginal face or faces of the mat and preventing distortion of the said soft strip by the stiff fibers.

4. A filter unit comprising a thin mat or pad composed of interfelted glass fibers, a strip of felt extending along the margins of said mat and providing means to form a seal between the filter unit and a frame in which said unit is designed to be installed, and a stiffening means interposed between said strip and the edges of the mat.

5. A filter unit comprising a body of loosely matter fibers in the form of a thin, flat mat, a sealing strip of soft resilient material extending along the margins of said unit, and a thin, flat strip of stiffening material extending lengthwise of said sealing strip, said stiffening strip being interposed between the sealing strip and the mat and overlying and forming a facing for the marginal surfaces of the mat, the faces of said stiffening strip being substantially perpendicular to the major faces of the mat.

6. A filter unit comprising a body of stiff glass fibers in the form of a thin, rectangular mat, said fibers extending mainly in planes parallel with the major faces of the mat and predominantly in substantial parallelism with each other, a strip of flexible material forming a binder for the edges of the mat, said strip consisting of felt or the like, and a stiffening strip interposed between said binding strip and the edges of the mat and holding the edge faces of the mat spaced from the opposite faces of the binder strip, said stiffening strip having sufficient stiffness and strength to effectively resist puncturing or distortion thereof by the stiff fibers and thereby serving to keep the fiber ends out of contact with the said flexible strip and prevent distortion or puncturing of the latter by the stiff fiber ends.

7. A filter structure comprising a plurality of filter units, each consisting of a thin mat or wafer of fibers and each having a strip of soft compressible material secured to the margins of the mat and surrounding the latter, a supporting frame in which said units are mounted in parallel superposed relation, said units movable bodily in a direction perpendicular to their major faces into position within said frame, and a clamping device arranged to engage the outermost of said units and thereby apply a clamping pressure distributed to the units in said direction and clamping them in position within said frame, with said marginal strips forming a seal between the frame and said units.

8. A filter structure comprising a plurality of filter units, each consisting of a thin mat or wafer of fibers and each having a strip of soft compressible material secured to the margins of the mat and surrounding the latter, a supporting frame in which said units are mounted in parallel superposed relation, said frame and units being so constructed that said units are bodily movable in a direction perpendicular to their major faces into position within said frame, a clamping device arranged to engage the outermost of said units and thereby apply a clamping pressure distributed to the units in said direction and clamping them in position within said frame, with said marginal strips forming a seal between the frame and said units, and spacing means interposed between the adjoining filter units and holding them in spaced relation with a confined space or chamber between each two adjoining units.

GAMES SLAYTER.